US006542845B1

(12) United States Patent
Grucci et al.

(10) Patent No.: US 6,542,845 B1
(45) Date of Patent: Apr. 1, 2003

(54) CONCURRENT EXECUTION AND LOGGING OF A COMPONENT TEST IN AN ENTERPRISE COMPUTER SYSTEM

(75) Inventors: Kyle T. Grucci, Nashua, NH (US); Raman Vellayappan, Arlington, MA (US); Arthur D. Frechette, Westford, MA (US); Alan E. Frechette, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 139 days.

(21) Appl. No.: 09/675,499

(22) Filed: Sep. 29, 2000

(51) Int. Cl.[7] .................................................. G06F 11/00
(52) U.S. Cl. ........................................ 702/122; 709/203
(58) Field of Search ................................ 702/122, 188, 702/108; 714/37, 38, 39; 709/202, 223–226; 370/245

(56) References Cited

U.S. PATENT DOCUMENTS

| | | | | |
|---|---|---|---|---|
| 5,790,977 A | * | 8/1998 | Ezekial ........................ 702/122 |
| 6,163,797 A | * | 12/2000 | Eckley et al. ................ 709/203 |
| 6,338,148 B1 | * | 1/2002 | Gillenwater et al. .......... 714/25 |
| 6,360,268 B1 | * | 3/2002 | Silva et al. .................. 709/227 |
| 2002/0004848 A1 | * | 1/2002 | Sudarshan et al. ........... 709/313 |
| 2002/0040409 A1 | * | 4/2002 | Matena et al. ............... 709/315 |

* cited by examiner

Primary Examiner—Marc S. Hoff
Assistant Examiner—Jeffrey R. West
(74) Attorney, Agent, or Firm—Beyer Weaver & Thomas, LLP

(57) ABSTRACT

A method of concurrently performing a component test with returning test result data in a distributed environment is disclosed. In general, in order to assure compatibility of the various components in an enterprise computing system, a service test is created as part of a compatibility test suite and passed to a test application server having a test application program. The test application program makes an initial connection to the component being tested that, in response, creates a connection to a logging listener. The logging listener spawns an acceptor corresponding to the component being tested. Once spawned, the component returns test data to its corresponding acceptor concurrently with the execution of the test.

23 Claims, 3 Drawing Sheets

CONCURRENT EXECUTION AND LOGGING OF A COMPONENT TEST IN AN ENTERPRISE COMPUTER SYSTEM

BACKGROUND OF THE INVENTION

1. Field of Invention

The invention relates generally to computer systems. More particularly, methods and apparatus for the concurrent component test execution and component test result logging in an enterprise computer system.

2. Description of Relevant Art

Enterprises today need to extend their reach, reduce their costs, and lower their response times by providing easy-to-access services to their customers, partners, employees, and suppliers. Typically, applications that provide these services must combine existing enterprise information systems (EIS) with new business functions that deliver services to a broad range of users. These services need to be highly available in order to meet the needs of today's global business environment secure so as to protect the privacy of users and the integrity of enterprise data, as well as both reliable and scalable to insure that business transactions are accurately and promptly processed. For a variety of reasons, these services are generally configured as distributed applications consisting of several tiers, including clients on the front end, data resources on the back end, and one or more middle tiers between them where the majority of the application development work is done. The middle tier implements the new services that integrate existing EISs with the business functions and data of the new service. The middle tier shields the client tier from the complexity of the enterprise and takes advantage of rapidly maturing Internet technologies to minimize user administration and training.

One approach to constructing such an enterprise computing system is to use component based, multi-tier applications based on, for example, Java 2 Enterprise Edition (J2EE) technology from Sun Microsystems Inc. of Mountain View, Calif. As well known in the art, J2EE is a Java platform designed for the mainframe-scale computing typical of large enterprises representing a multi-tier design that simplifies developing, deploying, and maintaining enterprise applications. IN this regard, J2EE has been designed to simplify application development in a thin client tier environment by simplifying application development and decreasing the need for programming and programmer training by creating standardized, reusable modular components and by enabling the tier to handle many aspects of programming automatically. It enables developers to focus on the specifics of programming their business logic, relying on the J2EE server to provide system services, and client-side applications (both stand alone and within web browsers) to provide the user interaction. Once developed, business logic can be deployed on servers appropriate to existing needs of an organization.

J2EE includes a number of components such as Enterprise JavaBeans (EJB) that is a server-based technology for the delivery of program components in an enterprise environment, Java servlet application program interfaces that enhances consistency for developers without requiring a graphical user interface, and Java Server Pages (that is the Java equivalent to Microsoft's Active Server Pages) is used for dynamic Web-enabled data access and manipulation.

Compatibility is one of the keys to the success of the J2EE and one of the factors that make it so productive for IT organizations. With this in mind, J2EE platform vendors will need to verify that their implementations conform to the J2EE platform specification. Toward that end, what is referred to as a J2EE Compatibility Test Suite (CTS) has been developed by Sun Microsystems that ensures consistent implementation across various vendor offerings. For application developers, this means full portability for enterprise applications. The CTS includes tests for all classes and methods required by the J2EE specification as well as end-to-end tests to check that all layers of a J2EE application will interact correctly and consistently. In this way, the CTS helps ensure that Enterprise JavaBeans components, JavaServer Pages, and servlets that run on one vendor's J2EE branded configuration will run on every J2EE branded configuration. In this way, the CTS assures enterprises and developers that APIs and development features are available in the branded implementation and work in a uniform way. As currently configured, however, when a distributed test is run, the test results are not returned until after the particular test has completed running. In those cases where, for example, the server has gone down, the information generated to that point is lost.

Therefore, in view of the foregoing, it would be advantageous and therefore desirable to have the capability of concurrently executing a distributed test and dynamically returning the associated output.

SUMMARY OF THE INVENTION

Broadly speaking, the invention relates to an improved method, apparatus and computer system for concurrently performing a component test with returning test result data in an enterprise computing environment. In one embodiment, a method of concurrently performing a distributed test with returning test result data in a distributed environment is disclosed. In general, when performing a distributed test, a test application program makes an initial connection to the server component being tested that, in response, creates a connection to a logging listener. In response, the logging listener spawns an acceptor corresponding to the component being tested. Once spawned, the server component being tested returns corresponding test data to its associated acceptor concurrently with the execution of the test.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In general, the invention relates to an improved method, apparatus and computer system for concurrently performing a component test with returning test result data in an enterprise computing environment. In one embodiment, a method of concurrently performing a component test with returning test result data in a distributed environment is disclosed. When performing a distributed test, a test application program makes an initial connection to the server component being tested that, in response, creates a connection to a logging listener. In response, the logging listener spawns an acceptor corresponding to the component being tested. Once spawned, the server component being tested returns corresponding test data to its associated acceptor concurrently with the execution of the test.

In this way, the invention provides a more efficient and robust approach to component testing in a distributed environment.

Although, the invention will initially be described in terms of a J2EE based enterprise computer system, the present invention can be used in any networked computer system that requires any form of distributed component testing. It should be noted that the J2EE application model divides enterprise applications into three fundamental parts: components, containers, and connectors. Components are the key focus of application developers, while system vendors implement containers and connectors to conceal complexity and promote portability. Containers intercede between clients and components, providing services transparently to both, including transaction support and resource pooling. Container mediation allows many component behaviors to be specified at deployment time, rather than in program code. Connectors sit beneath the J2EE platform, defining a portable service API to plug into existing enterprise vendor offerings. Connectors promote flexibility by enabling a variety of implementations of specific services.

Figure 1:
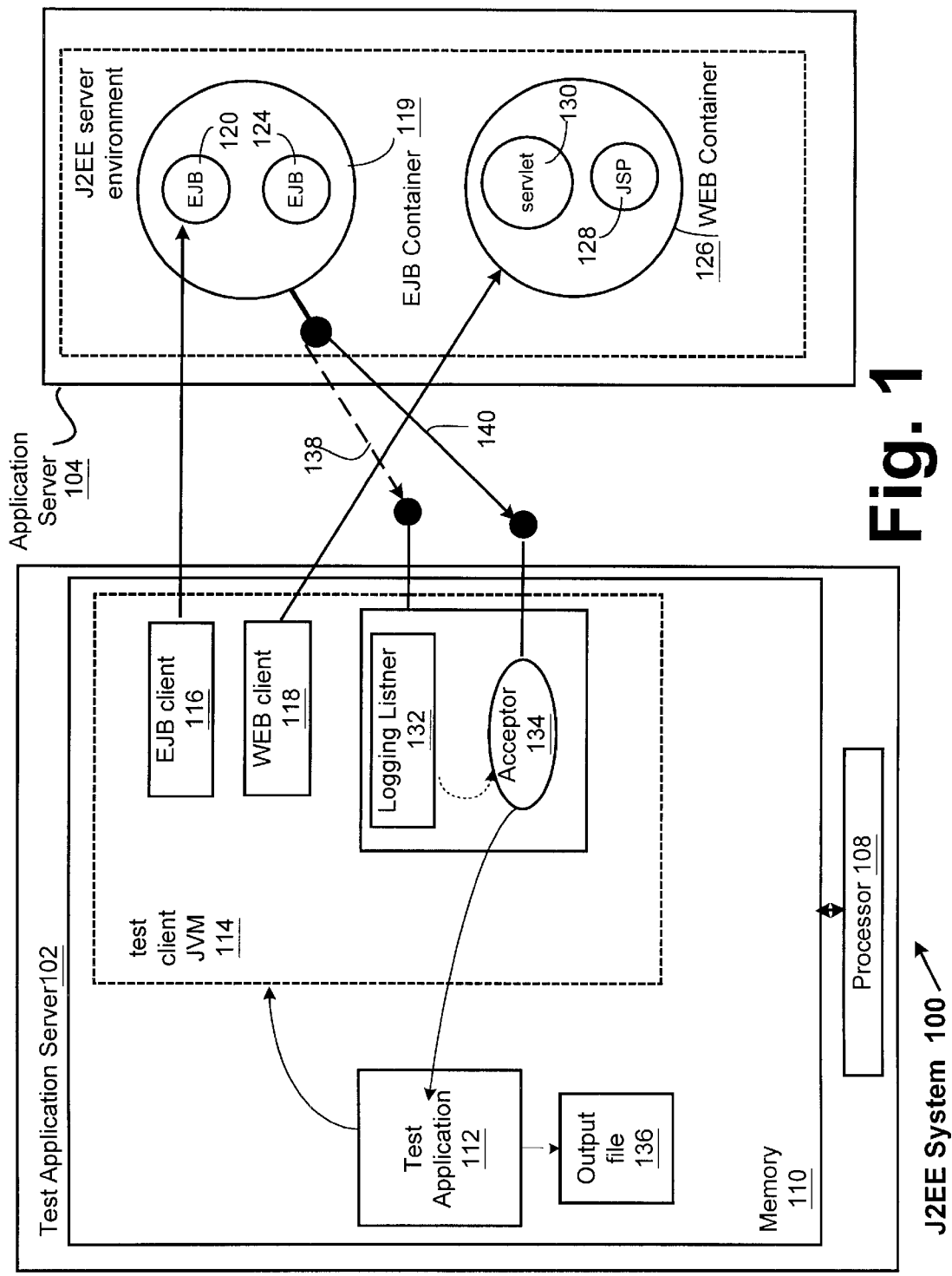
FIG. 1 shows a J2EE computing system test in accordance with an embodiment of the invention.

With reference to FIG. 1, an enterprise computing system 100 in accordance with an embodiment of the invention is shown. For the sake of this discussion, the enterprise computing system 100 is a J2EE system 100 but it should be noted that any component based distributed computing system can be used. In the described embodiment, the system 100 includes a test application server computer 102. The key to validating the Java 2Enterprise Edition is the J2EE Reference Implementation that provides all the specified technologies, plus a range of sample applications, tools, and documentation. This lightweight implementation of the J2EE standard is provided for two purposes. First, it provides system vendors with a standard by which to compare their own implementations. Second, it provides application developers with a way to familiarize themselves with J2EE technology as they explore commercial products for full-scale deployment of J2EE applications. Along these lines, the Compatibility Test Suite (CTS) ensures consistent implementation across various vendor offerings. For application developers, this means full portability for enterprise applications. The suite includes tests for all classes and methods required by the J2EE specification. It also includes end-to-end tests to check that all layers of a J2EE application will interact correctly and consistently.

With this in mind, the test application server computer 102 is coupled to an application server 104 that is used to test any number of components in a J2EE server environment. In the described embodiment, the test application server computer 102 includes a processor 108 used to perform executable instructions (i.e., software) stored in a memory 110 that take the form of a test application 112, also referred to as a test harness.

In a preferred embodiment, the test application 112 spawns a test client Java Virtual Machine (JVM) 114 having an EJB client 116 or a WEB client 118, which, respectively, are associated with an EJB container 119 having EJB's 120 and 124 and a WEB container 126 having a Java Server Page (JSP) 128 and a servlet 130. As well known in the art, business logic is encapsulated in Enterprise JavaBeans (EJB) components such that client interaction can be presented through plain HTML web pages, through web pages powered by Java technology-based applets, Java Servlets API, or JavaServer Pages technology, or through stand-alone Java applications. Components communicate transparently using various standards: HTML, XML, HTTP, SSL, RMI, IIOP, and others.

In a preferred embodiment, after the application server 104 to be tested is configured, the test application 112 executes the test client JVM 114. The test client JVM 114 then communicates with server component being tested. The server component responds by setting up a connection to a logging listener 132. The logging listener 132 then spawns an acceptor 134 that corresponds only to the component being tested. In this way, throughout a particular test run, the server component test output is dynamically sent to the associated acceptor that then passes the server test output to the test application 112. The test application 112 then writes the server output to a test output file 136. Therefore, using this invention, regardless of the number of JVMs that constitute a particular J2EE server environment, all output is returned to a single location in the form of the corresponding acceptor. In this way, all the outputs of a single distributed test are returned to a single predefined location.

For example, still referring to FIG. 1, the EJB client 116 sets up a connection to the EJB container 119. In the described embodiment, either the EJB 120 or the EJB 124 responds by setting up a connection 138 to the logging listener 132 that, in turn, spawns the acceptor 134. It should be noted that once the acceptor 134 has been spawned, the logging listener 132 no longer acts as intermediary between the EJBs 120 or 124 and the acceptor 134. In this way, the acceptor 134 is only associated with the server components from which it was originally spawned by the logging listener 132 so as to effectively establish a one on one connection between the server component (in this case, the EJBs 120 or 124) and the test output file 136. During a test run, the EJBs 120 or 124 outputs its associated test outputs 140 directly to the acceptor 134 such that the test outputs 140 are eventually written to the output file 136.

In this way, the test outputs 140 can be dynamically returned substantially simultaneously with the running of the associated component test on the EJBs 120 or 124 thereby preventing data loss in those cases where the J2EE server (not shown), for example, goes down which in conventionally arranged systems, would result in loss of said data.

Figure 2:
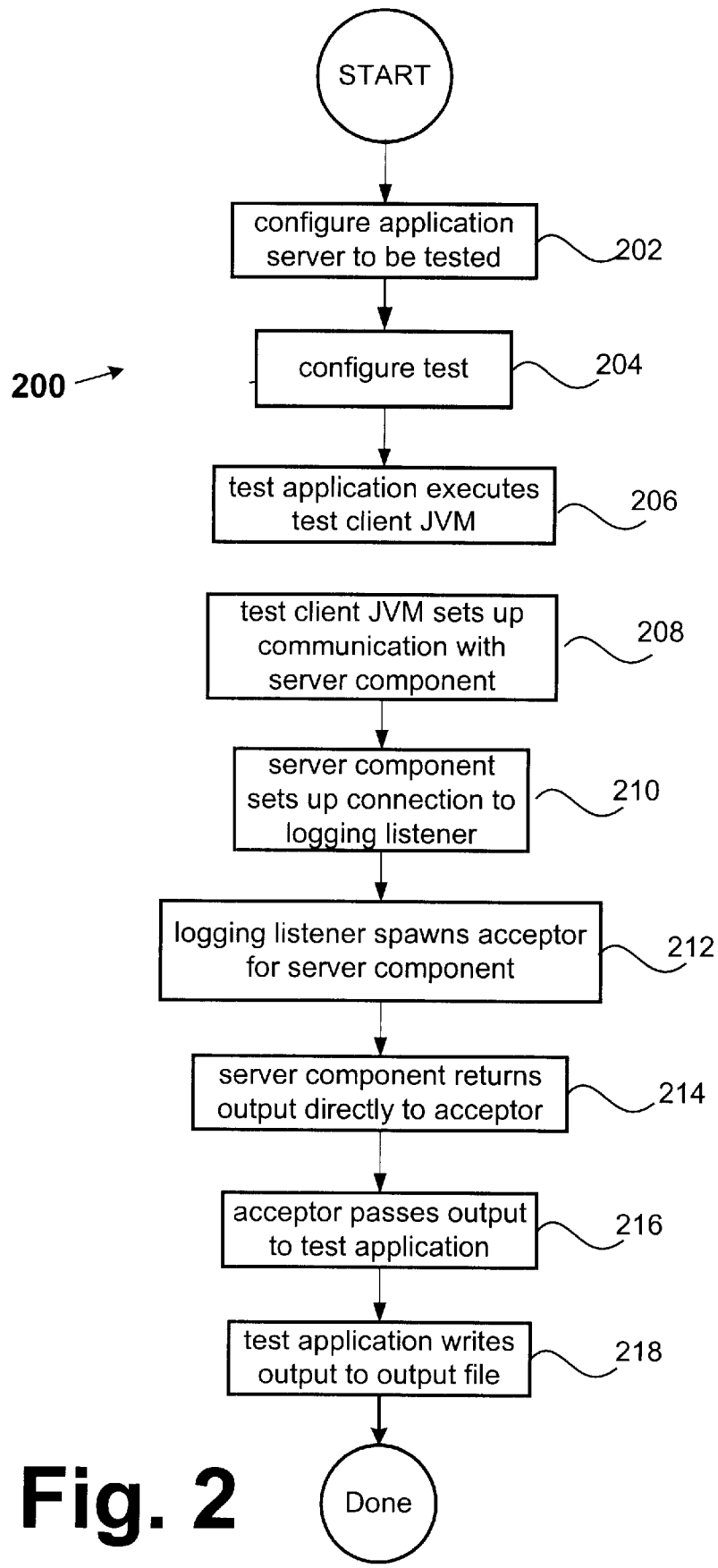
FIG. 2 shows a flowchart detailing a process dynamically returning server output associated with a component test in accordance with an embodiment of the invention.

FIG. 2 shows a flowchart detailing a process 200 dynamically returning server output associated with a component test in accordance with an embodiment of the invention. The process 200 starts at 202 by configuring the application server to be tested and the particular test at 204. The test application then executes the test client JVM at 206 which sets up a communication link with the server component at 208. The server component, in turn, sets up a connection to a logging listener module at 210 arranged to spawn an acceptor corresponding to the server component at 212. During a test run, the server component dynamically returns server output directly to the acceptor at 214 which passes the server output back to the test application at 216. The test application, in turn, writes the server output to a test file at 218.

Figure 3:
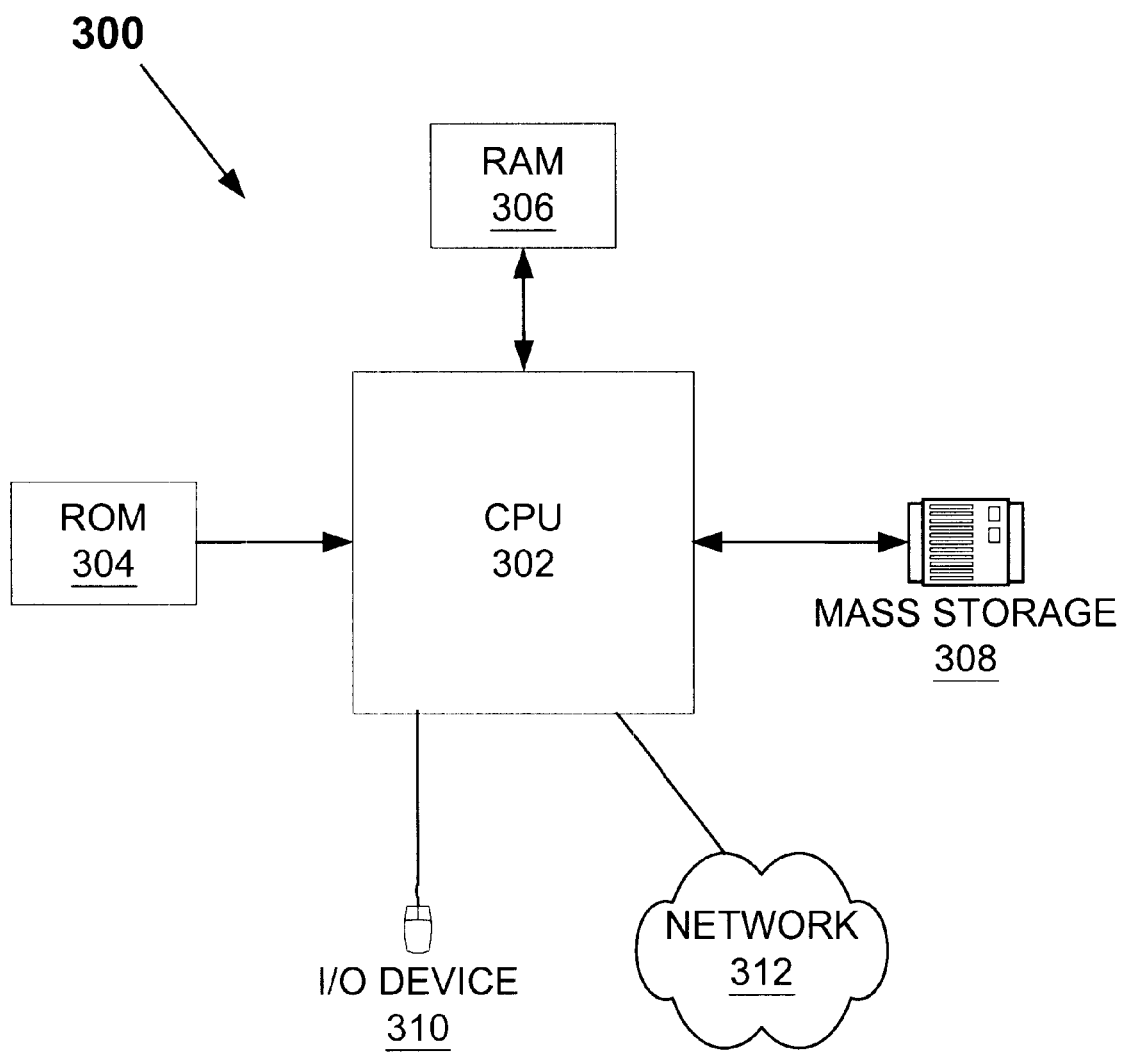
FIG. 3 illustrates a computer system that can be employed to implement the present invention.

FIG. 3 illustrates a computer system 300 that can be employed to implement the present invention. The computer system 300 or, more specifically, CPUs 302, may be arranged to support a virtual machine, as will be appreciated by those skilled in the art. As is well known in the art, ROM acts to transfer data and instructions uni-directionally to the CPUs 302, while RAM is used typically to transfer data and instructions in a bi-directional manner. CPUs 302 may generally include any number of processors. Both primary storage devices 304, 306 may include any suitable computer-readable media. A secondary storage medium 308, which is typically a mass memory device, is also coupled bi-directionally to CPUs 302 and provides additional data storage capacity. The mass memory device 308 is a computer-readable medium that may be used to store programs including computer code, data, and the like. Typically, mass memory device 308 is a storage medium such as a hard disk or a tape which generally slower than primary storage devices 304, 306. Mass memory storage device 308 may take the form of a magnetic or paper tape reader or some other well-known device. It will be appreciated that the information retained within the mass memory device 308, may, in appropriate cases, be incorporated in standard fashion as part of RAM 306 as virtual memory. A specific primary storage device 304 such as a CD-ROM may also pass data uni-directionally to the CPUs 302.

CPUs 302 are also coupled to one or more input/output devices 310 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 302 optionally may be coupled to a computer or telecommunications network, e.g., an Internet network, or an intranet network, using a network connection as shown generally at 312. With such a network connection, it is contemplated that the CPUs 302 might receive information from the network, or might output information to the network in the course of performing the above-described method steps. Such information, which is often represented as a sequence of instructions to be executed using CPUs 302, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Although only a few embodiments of the present invention have been described, it should be understood that the present invention may be embodied in many other specific forms without departing from the spirit or the scope of the present invention.

Although the methods of performing a distributed test and concurrently returning the associated test data in an enterprise computing system in accordance with the present invention are particularly suitable for implementation with respect to a Java™ based environment; the methods may generally be applied in any suitable object-based environment. In particular, the methods are suitable for use in platform-independent object-based environments. It should be appreciated that the methods may also be implemented in some distributed object-oriented systems.

It should also be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. A method of concurrently testing two or more server components capable of operating on at least one server in a distributed computing environment; said method comprising:

establishing an initial connection to at least one of said two or more server components;

generating at least one listener for said two or more server components;

establishing a connection between said at least one listener and said at least one server component after said initial connection has been established;

generating an acceptor for each one of the connections which is established between said at least one listener and said two or more server components;

executing one or more test applications to test said two or more server components; and returning results of said execution of said one or more test applications to two or more acceptors associated with said two or more server components when said executing of said one or more test applications is being performed.

2. A method as recited in claim 1, wherein said method further comprises:

configuring said one or more test applications to test said two or more server components.

3. A method as recited in claim 2, wherein said method further comprises:

initiating a test client virtual machine to test said two or more server components using said one or more test applications.

4. A method as recited in claim 3, wherein at least one of said test applications executes said test client virtual machine.

5. A method as recited in claim 4, wherein said generating of an acceptor is performed by said at least one listener.

6. A method as recited in claim 5, wherein said establishing of a connection between said at least one listener and said at least one server component is initiated by a server component.

7. A method as recited in claim 6, wherein said method further comprises:

storing said results to a single location.

8. A method as recited in claim 1, wherein said distributed computing environment is an enterprise computer system.

9. In a distributed computing environment, a testing server capable of testing two or more server components capable of operating on at least one other server in said distributed computing environment; said testing server further capable of:

establishing an initial connection to at least one of said two or more server components;

generating at least one listener for said two or more server components;

establishing a connection between said at least one listener and said at least one server component after said initial connection has been established;

generating an acceptor for each one of the connections which is established between said at least one listener and said two or more server components;

executing one or more test applications to test said two or more server components; and returning results of said execution of said one or more test applications to two or more acceptors respectively associated with said two or more server components when said executing of said one or more test applications is being performed.

10. A testing server as recited in claim 9, wherein said server comprises:

a test application; and a test client virtual machine.

11. A testing server as recited in claim 10, wherein said test client virtual machine comprises at least one client component which correspond to said two or more server components, and wherein said at least one client component is capable of establishing an initial connection to at least one of said two or more server components.

12. A testing server as recited in claim 11, wherein said server further comprises:

a logging listener; and two or more acceptors.

13. A method of concurrently testing two or more server components capable of operating on at least one server in a distributed computing environment; said method comprising:

configuring one or more test applications to test said two or more server components;

initiating a test client virtual machine to test said two or more server components using said one or more test applications;

establishing an initial connection to at least one of said two or more server components;

generating at least one listener for said two or more server components;

establishing a connection between said at least one listener and said at least one server component after said initial connection has been established;

generating an acceptor for each connection which is established between said at least one listener and said two or more server components;

executing one or more test applications to test said two or more server components;

returning results of said execution of said one or more test applications to two or more acceptors associated with said two or more server components when said executing of said one or more test applications is being performed; and storing said results to a single location.

14. A method as recited in 13, wherein at least one of said test applications executes said test client virtual machine.

15. A method as recited in claim 13, wherein said generating of an acceptor is performed by said at least one listener.

16. A method as recited in claim 13, wherein said establishing of a connection between said at least one listener and said at least one server component is initiated by said server component.

17. A method as recited in claim 13, wherein said distributed computing environment is an enterprise computer system.

18. A computer readable medium including computer program code for concurrently testing two or more server components capable of operating on at least one server in a distributed computing environment; said computer readable media comprising:

computer program code for establishing an initial connection to at least one of said two or more server components;

computer program code for generating at least one listener for said two or more server components;

computer program code for establishing a connection between said at least one listener and said at least one server component after said initial connection has been established;

computer program code for generating an acceptor for each one of the connections which are established between said at least one listener and said two or more server components;

computer program code for executing one or more test applications to test said two or more server components; and computer program code for returning results of said execution of said one or more test applications to two or more acceptors associated with said two or more server components when said executing of said one or more test applications is being performed.

19. A computer readable medium as recited in claim 18, wherein said computer readable medium further comprises:

computer program code for configuring said one or more test applications to test said two or more server components.

20. A computer readable medium as recited in claim 18, wherein said computer readable medium further comprises:

computer program code for initiating a test client virtual machine to test said two or more server components using said one or more test applications.

21. A computer readable medium as recited in claim 18, wherein at least one of said test applications execute said test client virtual machine.

22. A computer readable medium as recited in claim 18, wherein said computer program code further comprises:

computer program code for storing said results to a single location.

23. A distributed computing environment as recited in claim 18, wherein said distributed computing environment is an enterprise computer system.

* * * * *

UNITED STATES PATENT AND TRADEMARK OFFICE
CERTIFICATE OF CORRECTION

PATENT NO. : 6,542,845 B1
DATED : April 1, 2003
INVENTOR(S) : Grucci et al.

It is certified that error appears in the above-identified patent and that said Letters Patent is hereby corrected as shown below:

<u>Title page,</u>
Item [75], change inventors name from "Raman Vellayappan" to
-- Vellayappan Raman --.

Signed and Sealed this

Eighteenth Day of November, 2003

JAMES E. ROGAN
*Director of the United States Patent and Trademark Office*